United States Patent [19]
Micheli et al.

[11] 3,896,409
[45] July 22, 1975

[54] LIQUID LEVEL SENSOR FOR CORROSIVE BATHS

[75] Inventors: Adolph L. Micheli; Dennis F. Dungan, both of Mt. Clemens, Mich.

[73] Assignee: General Motors Corporation, Detroit, Mich.

[22] Filed: Oct. 18, 1974

[21] Appl. No.: 515,924

[52] U.S. Cl. .................................. 338/28; 338/229
[51] Int. Cl. ............................................ H01c 7/00
[58] Field of Search ....................... 338/25, 28, 229; 73/362 AR, 359; 340/228

[56] References Cited
UNITED STATES PATENTS

| | | | |
|---|---|---|---|
| 3,091,119 | 5/1963 | Fischer et al. | 73/359 X |
| 3,312,108 | 4/1967 | Avery | 73/359 |
| 3,499,310 | 3/1970 | Hundere et al. | 73/359 X |

Primary Examiner—C. L. Albritton
Attorney, Agent, or Firm—Robert J. Wallace

[57] ABSTRACT

A thermistor assembly for use in liquid level sensing applications, especially for corrosive liquids. A thermistor element has two conductor wires attached to opposite faces. A thin coating of sintered Teflon particles surrounds the thermistor element and the wires. The Teflon coating provides a lead-impervious coating for the thermistor element and electrically insulates each of the conductor wires. The thermistor is immersed in a volume of a lead alloy conforming to the closed end of a protective corrosion-resistant tube. The lead alloy serves as a heat exchange member and permits positioning of the thermistor at a predetermined spacing relative to the side walls of the tube to achieve desired response time.

3 Claims, 3 Drawing Figures

PATENTED JUL 22 1975 3,896,409

LIQUID LEVEL SENSOR FOR CORROSIVE BATHS

BACKGROUND OF THE INVENTION

This invention relates to thermistors for use in liquid level sensing applications. More particularly it relates to a novel thermistor assembly and a method of making the same wherein the thermistor assembly is particularly adapted for sensing hot corrosive baths.

Liquid level sensors which operate on a principle of the cooling effect of the liquid on a temperature sensitive resistor or thermistor are known to the art. The thermistor is immersed in a liquid whose level is to be sensed, and electrically connected into a circuit having a voltage source and an appropriate warning device. Current from the voltage source flows through the thermistor and generates heat therein. When the thermistor is immersed in the liquid being sensed, the heat is removed almost as quickly as it is generated. The temperature of the thermistor thus remains relatively constant and its resistance unchanged. Accordingly, the temperature of the thermistor is limited to approximately the temperature of the liquid. At these temperatures the resistance of the thermistor is such that only a limited portion of voltage of the source appears across the warning device so that it is not activated.

However, if the liquid is not in contact with the thermistor, the heat generated within the device is not removed by the liquid, and results in a self-heating effect within the device. This self-heating effect results in a thermistor temperature rise, and a responsive change in its electrical resistance. This process eventually changes the resistance of the device to such an extent that the voltage across the warning device is large enough to activate it thereby signaling a drop in liquid level.

In some liquid level applications, it is advantageous to package the thermistor in a suitable housing. It has been suggested to fuse the thermistor into the closed end of a soft glass tube which can be melted at temperatures of about 400°– 500° C. Such a housing provides satisfactory protection for the thermistor in most applications. However, it will not provide adequate protection when the liquid being sensed is a hot, corrosive acid or alkaline solution. We have found that quartz or fused silica is resistant to acid solutions, while magnesia is resistant to alkaline solutions. However, these and similar corrosion resistant materials melt only at very high temperatures of about 1,600° C. Accordingly, the thermistor cannot be fused into tubes made of these materials as the high temperatures during the fusion process would degrade the thermistor characteristics.

Different liquid level sensing applications may require different response times from the thermistor. However, the prior art thermistor assemblies have not provided such flexibility without relatively major changes in the housings and assembly processes. It would be advantageous to provide a thermistor assembly in which the same parts or housings can be used, while permitting the response time to be changed with only minor changes in assembling it. Such flexibility would reduce costs for the high volume manufacturer.

OBJECTS AND SUMMARY OF THE INVENTION

Therefore, it is an object of this invention to provide a liquid level sensor for corrosive liquids that permits low cost packaging of a thermistor element in a protective corrosion resistant tube while retaining excellent thermal conduction between the liquid being sensed and the thermistor.

It is another object of this invention to provide a liquid level sensor having an assembly with relatively few parts that permits the comparatively low cost manufacture of a plurality of sensors having different response times as required for different liquid level sensing applications.

In brief, the liquid level sensing thermistor assembly of the present invention has conductor wires attached to opposing faces of a thermistor element. A sprayed coating of sintered Teflon particles surrounds the thermistor element and the conductor wires extending therefrom. The thin coating of sintered Teflon particles advantageously serves the dual purpose of electrically insulating the conductor wires from one another and provides a protective impervious barrier to a lead alloy heat exchange member within the closed end of a corrosive resistant tube. The Teflon coated thermistor element permits embedding it in the lead alloy heat exchange member while the lead is in a molten state. Accordingly, the thermistor can be readily positioned at a desired spacing relative to the side walls of the tube to provide the desired response time of the thermistor element.

DESCRIPTION OF THE PREFERRED EMBODIMENTS

Figure 1:
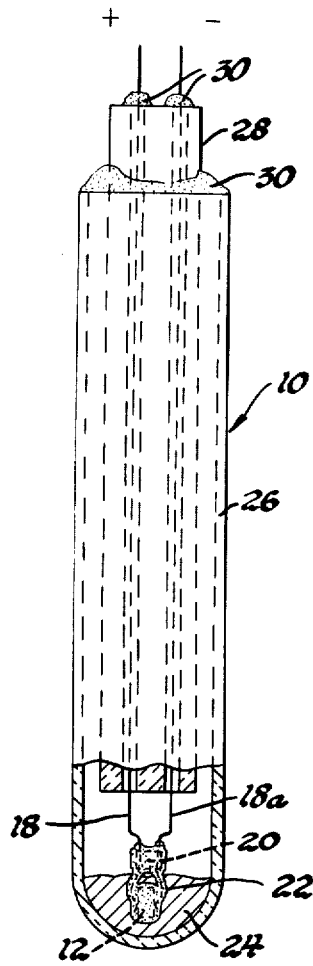
FIG. 1 shows an elevational view partially in section of an illustrative embodiment of the thermistor assembly device of this invention.

Referring now to the drawings, an illustrative embodiment of the thermistor assembly of this present invention is generally designated as 10. The thermistor assembly 10 includes a disc of barium titanate serving as thermistor element 12. In this illustrative embodiment, thermistor element 12 is barium titanate having an emperical formula of:

$$Ba_{.80} Pb_{.20} Ce_{.001} TiO_3$$

However, it should be understood that other thermistor elements such as silicon can be substituted for the barium titanate. The disc-like shape of the thermistor element 12 provides two substantially parallel major surfaces to which thermocompression wire bonds may easily be made. In this example thermistor element 12 is approximately 5.75mm in diameter and 1.25mm thick between its two major parallel faces.

To provide wire bondable surfaces to the thermistor element 12 a thin layer 14 and 14a of nickel approximately 1 mil thick is applied to the two major faces of the element 12. This can be accomplished by known electroless nickel plating. Nickel is preferred because it adheres well to the thermistor element 12, thus forming an ohmic contact. A second layer 16 and 16a of aluminum is applied over the nickel layers 14 and 14a, respectively. Aluminum layers 16 and 16a are approximately 1 mil thick. They can be applied by known vapor deposition methods. Aluminum is chosen for layers 16 and 16a because it adheres well to the nickel layers 14 and 14a and provides a good wire bondable surface for aluminum conductor wires 18 and 18a. The conductor wires 18 and 18a are bonded to the aluminum layers 16 and 16a, respectively, preferably by known thermo-compression bonding techniques.

Figure 2:
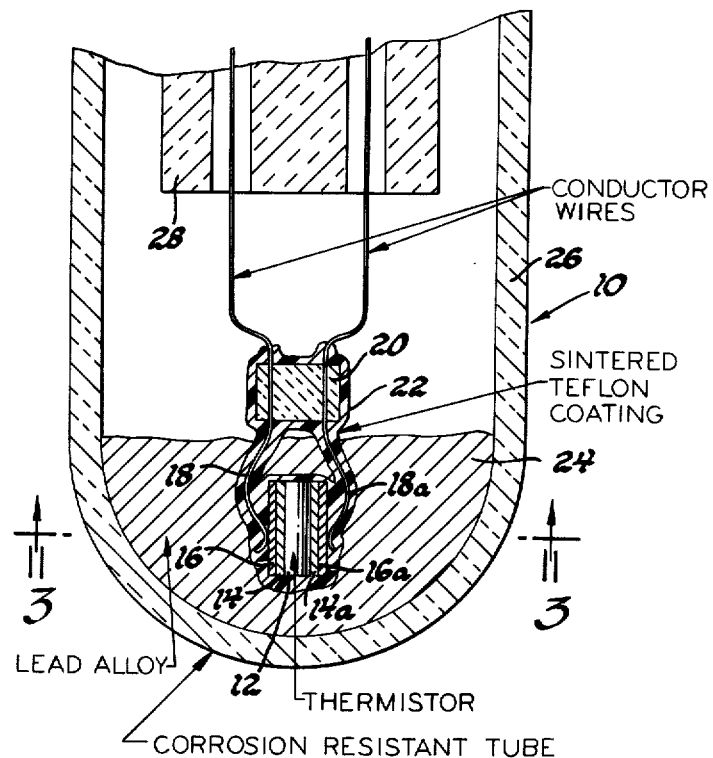
FIG. 2 shows an enlarged fragmentary sectional view of the lower portion of the embodiment of FIG. 1.
Figure 3:
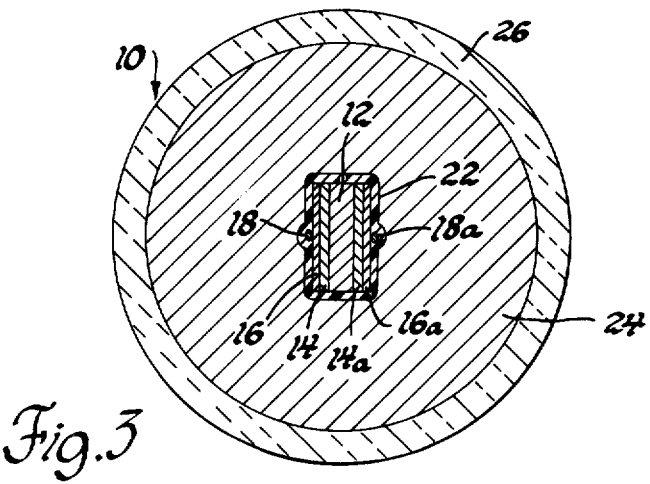
FIG. 3 shows a sectional view along the lines 3—3 of FIG. 2.

As can be seen most clearly in FIG. 2, the conductor wires 18 and 18a are threaded through two spaced holes in a ceramic insulator support 20. The support 20 is tubular, approximately 3mm in diameter. The support 20 electrically insulates the conductor wires 18 and 18a from one another and also aids in handling the thermistor element 12.

An essential feature of this invention is the sprayed sintered Teflon coating 22. As can be seen most clearly in FIG. 2, the sprayed sintered Teflon coating 22 surrounds the thermistor element 12, the ceramic support 20, and the conductor wires 18, 18a between the support 20 and thermistor element 12. It is essential to our invention that the Teflon coating 22 be at least 0.025 mm thick and not more than 0.25 mm thick. A thinner Teflon coating will not provide an electrically insulative impervious barrier to the lead alloy heat exchange member 24. Furthermore, a thinner Teflon coating 22 will not adequately protect the thermistor element 12 from the temperatures of the lead when it is in its molten state as will be discussed later in this specification. A thicker Teflon coating 22, however, will degrade the response of the thermistor element to an unpractical level. We have found that the most practical method of applying such a thin Teflon coating is to spray the Teflon coating. Preferably, the above mentioned parts are sprayed with a primer (not shown) such as DuPont No. 85-204 Teflon Primer. Teflon (polytetrafluoroethylene) coating 22 is then sprayed over the primer to the desired thickness. High Build Enamel No. 85-224 of DuPont Chemical Company is preferred for Teflon coating 22. To provide an impervious barrier to the lead alloy heat exchange member 24, the sprayed Teflon coating 22 is baked at about 260° C. for approximately 60 minutes. The elements which are coated by the sprayed sintered Teflon particles form a subassembly.

The next step in producing the thermistor assembly 10 is to pour a predetermined volume of a molten lead (Pb) alloy into the bottom of a fused silica tube 26. The lead alloy serves as a heat exchange member 24. A lead alloy is chosen for the heat exchange member 24 because it has good thermal conductivity and melts at a relatively low temperature so as not to degrade the characteristics of the thermistor element 12. By lead alloy, we mean metal comprising more than 50 percent lead and having a melting point of less than about 350° C. In this embodiment pure lead is used for heat exchange member 24. For a fused silica tube 26 having an inside diameter of 8 mm, a volume of lead of about 0.2 cc to 2.0 cm³ is chosen to give optimum response to the thermistor element 12. It should be noted that the lead alloy heat exchange member 24 can either be first melted and poured into the tube, or a solid pellet of predetermined volume of lead can be placed into the tube and then the tube heated to melt the lead.

The sprayed sintered Teflon coated thermistor subassembly is then lowered into the molten lead 24. It is a feature of this invention that the thermistor subassembly may be positioned in the lead heat exchange member 24 at various depths while the lead is still molten. Therefore, one can readily vary the response time of the thermistor by positioning the thermistor element 12 at a predetermined distance from the walls of the fused silica tube 26. In other words the further the Teflon coated subassembly is immersed into the lead heat exchange member 24, the faster the response time of the thermistor element 12. It can be appreciated that such flexibility in varying the response time of the thermistor element is quite advantageous in high volume production. That is, the manufacturer can use the same basic parts or elements of the thermistor assembly 10 of this invention, yet the manufacturer can readily vary the response time of the device according to the depth of the placement of the Teflon coated thermistor subassembly in the molten lead alloy heat exchange member 24. For example, by always using a predetermined volume of lead alloy the top portion of the conductor wires can be marked to signify the resulting thermistor response time. In such manner, the operator need only align one of the marks with the top of the tube in order to fix or set the response time as desired.

The function of the Teflon coating 22 can now be appreciated. First, it electrically insulates conductor wires 18 and 18a from the electrically conductive lead alloy heat exchange member 24, regardless of the level of thermistor subassembly immersion in the lead alloy heat exchange member 24. Second, although the melting point of the lead is relatively low, the Teflon coating 22 insures that the temperature of the molten lead does not degrade thermistor characteristics. Thirdly, the sintered Teflon coating 22 provides an impervious barrier to the lead alloy heat exchange member 24 so that the lead will not diffuse into the thermistor element 12 thereby insuring that the lead will not degrade the characteristics of the thermistor element 12 or short it out.

As an illustrative example, the spacing between the thermistor element 12 and the bottom of the fused silica tube 26 is approximately 1.5 mm. This spacing results in a response time of approximately 30 seconds. That is, the resistivity of the thermistor element 12 will have a 1:5 change in resistivity within 30 seconds after the liquid level falls out of contact with the thermistor assembly 10. It is also a feature of this invention that the fused silica tube 26 is extremely corrosive resistant to hot (above 70° C.), acid solutions. The thickness of the walls defining the fused silica tube 26 is between 0.5mm and 3mm. A thinner wall thickness will not hold up in most hot acid solutions, while a thicker wall thickness increases the response time of the thermistor element 12 to an unpractical level. It should also be noted that we have discovered that a magnesia tube may be substituted for the fused silica tube 26 if the liquid being sensed is a hot alkaline solution. Magnesia provides a corrosive resistant protection against alkaline solutions, as does fused silica for hot acid solutions.

Completing the thermistor assembly 10 is a twin bore silica tube 28. The conductor wires 18 and 18a are threaded through each of the bores to electrically insulate them from one another. Wax seals 30 cover the openings between the inner tube 28 and the outer tube 26, as well as the openings between the bores in the inner tube 28 and the conductor wires 18, 18a.

What we claim as new and desire to secure by letters patent of the United States is:

1. A thermistor assembly for liquid level sensing applications involving corrosive liquids which is easily manufactured and which has a response time that is readily set during said manufacture, said assembly comprising:

a thermistor element;

at least two electrically conductive wires attached to said thermistor element;

a corrosion resistant tube having a closed end portion with a wall thickness of about 0.5 – 3 mm wherein said tube provides protection for said thermistor from corrosive solutions whose liquid level is to be sensed while serving as a thermal conductor therebetween;

a lead alloy heat exchange member in the closed end portion of said tube and directly contacting the inner walls thereof;

a coating of sintered polytetrafluoroethylene particles between about 0.025 – 0.25 mm thick on said thermistor element and said conductor wires extending from said thermistor element, thereby forming a polytetrafluoroethylene coated thermistor subassembly; and said polytetrafluoroethylene coated thermistor subassembly being immersed in said lead alloy heat exchange member at a predetermined spacing relative to the walls of said tube wherein the spacing therebetween determines the response of said thermistor element, said polytetrafluoroethylene coating providing an impervious barrier to said lead alloy heat exchange member and electrically insulating said conductor wires from said lead alloy heat exchange member.

2. A thermistor assembly for liquid level sensing applications involving acid solutions which is easily manufactured and which has a response time that is readily set during said manufacture, said assembly comprising:

a thermistor element;

at least two electrically conductive wires attached to said thermistor element;

a fused silica tube having a closed end portion with a wall thickness of about 0.5 – 3 mm and an inside diameter of about 8 mm wherein said fused silica tube is corrosion resistant to acid solutions whose liquid level is to be sensed;

a lead alloy heat exchange member having a predetermined volume of about 0.2 – 2.0 $cm^3$ in the closed end portion of said fused silica tube and directly contacting the inner walls thereof;

a sprayed coating of sintered polytetrafluoroethylene particles between about 0.025 – 0.25 mm thick on said thermistor element and said conductor wires extending from said thermistor element, thereby forming a polytetrafluoroethylene coated thermistor subassembly; and said polytetrafluoroethylene coated thermistor subassembly being immersed in said lead alloy heat exchange member at a predetermined spacing relative to the walls of said fused silica tube wherein the spacing therebetween determines the response of said thermistor element, said polytetrafluoroethylene coating providing an impervious barrier to said lead alloy heat exchange member and electrically insulating said conductor wires from said lead alloy heat exchange member.

3. A thermistor assembly for liquid level sensing applications involving alkaline solutions which is easily manufactured and which has a response time that is readily set during said manufacture, said assembly comprising:

a disc-shaped thermistor element having metallic electrodes on its major faces;

at least two electrically conductive wires bonded to said electrodes on said thermistor element;

a magnesia tube having a closed end portion with a wall thickness of about 0.5 – 3 mm and an inside diameter of about 8 mm wherein said magnesia tube is corrosion resistant to alkaline solutions whose liquid level is to be sensed;

a lead alloy heat exchange member having predetermined volume of about 0.2 – 2.0 $cm^3$ in the closed end portion of said magnesia tube and directly contacting the inner walls thereof;

a sprayed coating of sintered polytetrafluoroethylene particles between about 0.025 – 0.25 mm thick on said thermistor element and said conductor wires extending from said thermistor element, thereby forming a polytetrafluoroethylene coated thermistor subassembly; and said polytetrafluoroethylene coated thermistor subassembly being immersed in said lead alloy heat exchange member at a predetermined spacing relative to the walls of said magnesia tube wherein the spacing therebetween determines the response of said thermistor element, said polytetrafluoroethylene coating providing an impervious barrier to said lead alloy heat exchange member and electrically insulating said conductor wires from said lead alloy heat exchange member.

* * * * *